(12) United States Patent
Kleppen et al.

(10) Patent No.: US 6,285,003 B1
(45) Date of Patent: Sep. 4, 2001

(54) WELDING TORCH WITH INTEGRAL CONTROL

(75) Inventors: Arthur L. Kleppen, Auburn; Stephan John Schmidt, Maple Valley, both of WA (US)

(73) Assignee: C-K Worldwide Inc., Auburn, WA (US)

( * ) Notice: Subject to any disclaimer, the term of this patent is extended or adjusted under 35 U.S.C. 154(b) by 0 days.

(21) Appl. No.: 09/532,652

(22) Filed: Mar. 22, 2000

Related U.S. Application Data

(63) Continuation-in-part of application No. 09/306,681, filed on May 6, 1999, now Pat. No. 6,051,808, which is a continuation-in-part of application No. 09/018,622, filed on Feb. 4, 1998, now abandoned.

(51) Int. Cl.[7] .................................................. B23K 9/10
(52) U.S. Cl. ............................................ 219/132; 219/75
(58) Field of Search ........................................ 219/132, 75

(56) References Cited

U.S. PATENT DOCUMENTS

| | | | |
|---|---|---|---|
| 3,968,341 | 7/1976 | Manning | 219/132 |
| 4,051,344 | 9/1977 | Robbins | 219/132 |
| 4,227,066 | 10/1980 | Bulwidas, Jr. | 219/132 |
| 4,510,373 | 4/1985 | Cox et al. | 219/137.71 |
| 4,948,942 | 8/1990 | Hübel | 219/132 |
| 6,051,808 | * 4/2000 | Kleppen | 219/132 |

\* cited by examiner

*Primary Examiner*—Clifford C. Shaw
(74) *Attorney, Agent, or Firm*—Keith D. Gehr

(57) ABSTRACT

The invention is a welding parameter control device for a welding torch operable by the welders thumb and/or index finger. A forward-located rotary knob or belt is positioned where the torch is of relatively small diameter and comfortable for the welder to hold in the hand. This is coupled to a potentiometer located toward the rear portion of the torch. If a rotary potentiometer is used, the torch diameter here can be increased without discomfort to the welder. By placing the potentiometer in this position it can be much larger and more rugged than would be possible if located at the position of the control knob. If a linear potentiometer is used, the body may be maintained very slim over its entire length. Weld disturbance due to torch movement during current adjustment is virtually eliminated by use of the fingertip operated rotary control.

5 Claims, 6 Drawing Sheets

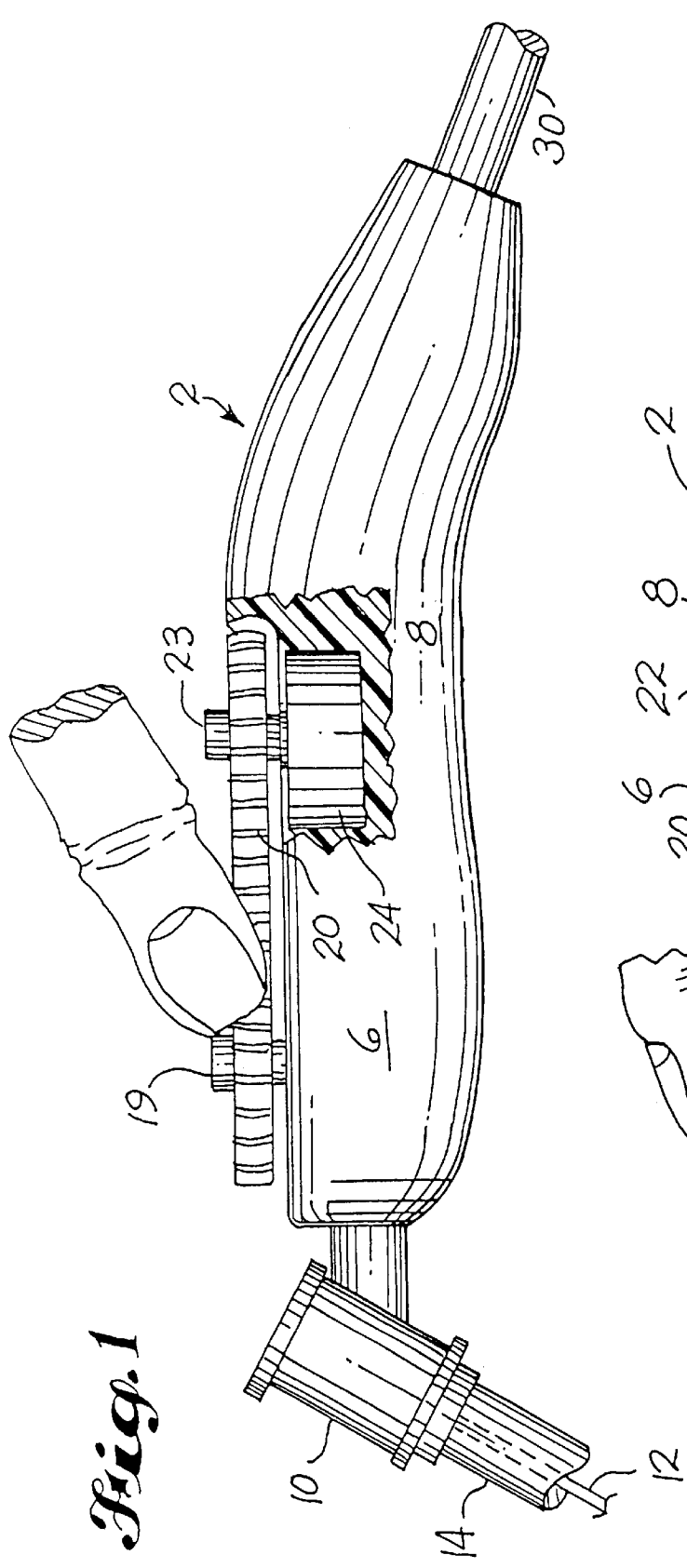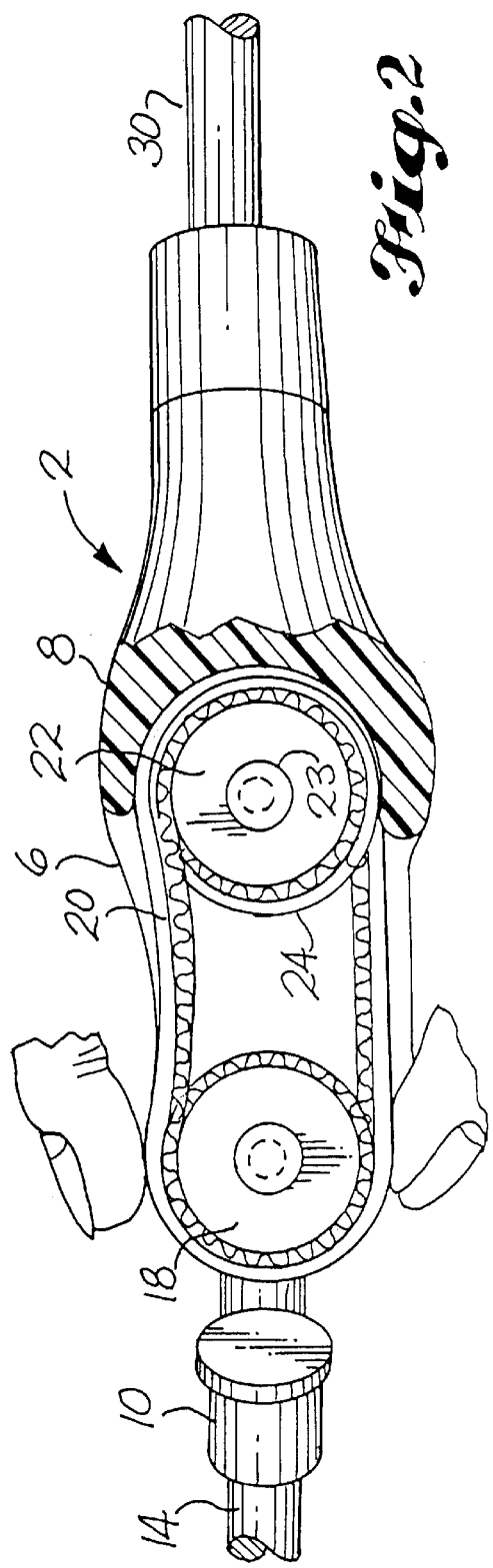

WELDING TORCH WITH INTEGRAL CONTROL

This invention is a continuation-in-part of application Ser. No. 09/306,681, filed May 6, 1999 and now U.S. Pat. No. 6,051,808, which in turn was a continuation-in-part of Ser. No. 09/018,622, filed Feb. 4, 1998, now abandoned.

The present invention is an improved control mechanism for a welding torch used for gas shielded electric arc welding. The mechanism may be readily adapted for control of current, voltage, wire speed or other welding variables. The torch is particularly convenient since it gives the welder immediate and precise fingertip control of welding conditions without disrupting control of the bead of weld metal being laid down.

BACKGROUND OF THE INVENTION

Torches that give a welder control of electric current by some mechanism located on the torch itself are fairly well known. As examples, reference might be made to U.S. Pat. No. 4,051,344 to Robbins or U.S. Pat. No. 4,948,942 to Hiibel. Other related current control mechanisms are shown in U.S. Pat. No. 3,968,341 to Manning and U.S. Pat. No. 4,227,066 to Bulwidas, Jr. U.S. Pat. No. 4,501,373 to Cox et al. shows a torch handle control described as useful for regulating welding voltage or electrode wire speed. The torch described in the Hiibel patent, commonly assigned with the present invention, has had considerable commercial success. A sliding button on the top of the torch body can be activated by the thumb or forefinger of the welder for real time control of amperage. While this design has been a major improvement over previously available torches, one minor shortcoming has been noted. As a welder pushes the current control button forward, the torch tends to dip slightly bringing it closer to the weld zone. Similarly, when the button is moved rearward there is a tendency to slightly raise the torch. This movement may have a significant effect on the weld integrity since the arc length is somewhat changed.

The invention to be described is designed to overcome the above noted major problem of torch movement when adjusting welding current.

SUMMARY OF THE INVENTION

The present invention is a gas shielded electric arc welding torch having an integral fingertip operable welding parameter control mechanism. The parameter controlled can be welding current, voltage, wire speed, gas flow, or some other welding variable. The torch has an axially elongated body sized to be comfortably held in a welder's hand. The anterior portion of the body has affixed to it the usual head portion containing the metal electrode and a surrounding gas cup. A stream of weld blanketing gas, typically an inert gas such as argon, is delivered to the gas cup to shield the electrode and blanket the adjacent weld zone. Cooling water may also be circulated to the head, as is conventional practice.

A welding parameter control is located on the top of the anterior portion of the body, posterior to the head, in a location convenient for adjustment by a slight motion of the welder's thumb or index finger. This control includes a closed loop belt coupled to a potentiometer located near the rear of the torch body at a point where it is essentially behind the welder's hand. If a rotary potentiometer is used, the body may be enlarged at this point to accommodate a potentiometer of more conventional size and ruggedness. In turn, the potentiometer is connected to appropriate conventional circuitry controlling welding current, voltage or other desired parameter. The term "closed loop belt" should be read broadly so as to include a chain or other functionally equivalent loop. The welder's thumb or index finger may act directly either against a forward-located control knob coupled to the belt or against the belt itself. The motion required is such that it will not cause the torch to dip or rise during current adjustments. For example, a forward movement of the index finger against one side of the control might increase current while a corresponding movement by the thumb on the other side would decrease current, Where the term "finger control" is used it should be read broadly to mean thumb or any other finger, normally the index finger.

Alternatively, the potentiometer operated by the closed loop belt may have an on-off switch coupled to it.

It is an object of the present invention to provide a welding torch having an improved finger control for control of a desired welding parameter.

It is another object to provide a welding torch that is not subject to displacement from the weld area during real time operating parameter adjustment.

These and many other objects will become readily apparent upon reading the following detailed description taken in conjunction with the drawings.

BRIEF DESCRIPTION OF THE DRAWINGS

FIG. 1 is a partially cut away side elevation of the welding torch.

FIG. 2 is a similar plan view of the torch.

DETAILED DESCRIPTION OF THE PREFERRED EMBODIMENTS

Figure 3:
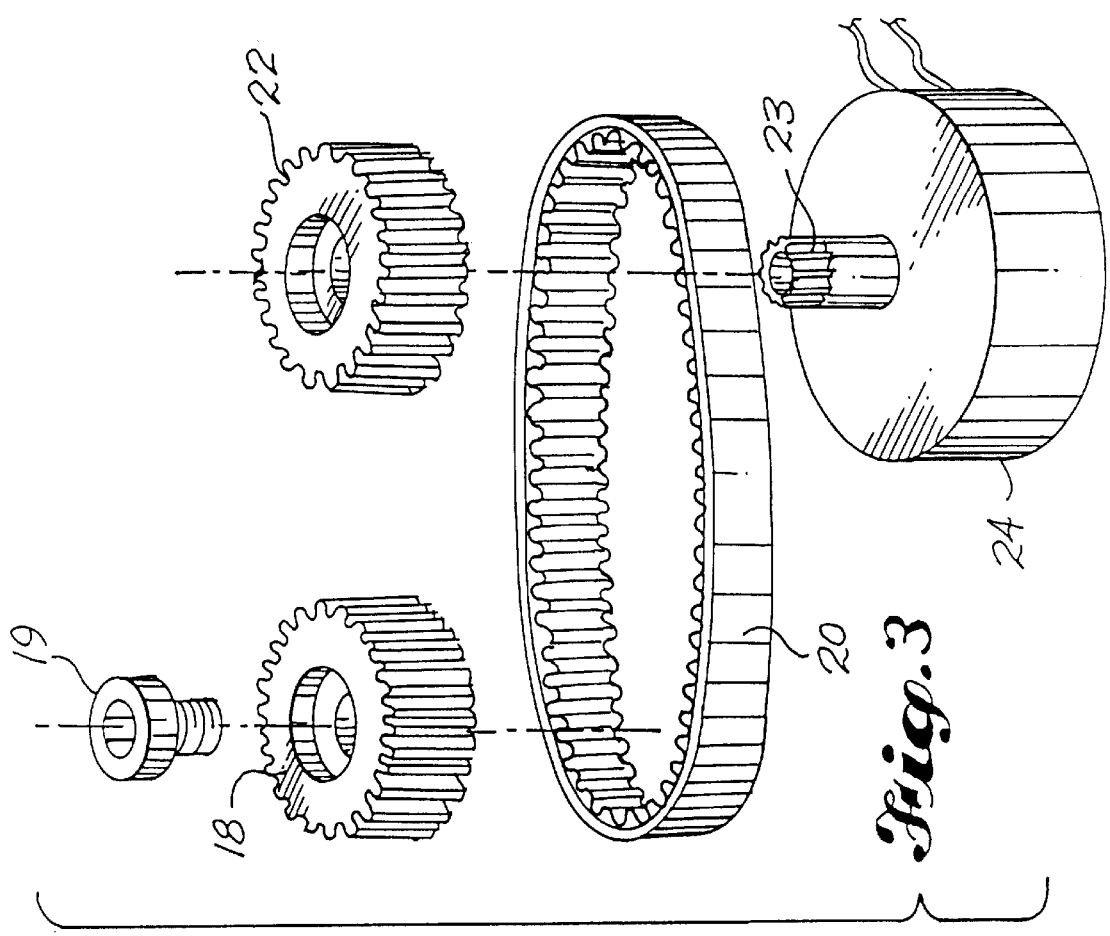
FIG. 3 shows one version of the mechanism linking the control knob with a rotary potentiometer.

Reference should now be made to FIGS. 1–3 of the drawings for an understanding of the invention. While the drawings illustrate a tungsten inert gas type welding torch, the invention is equally applicable to other welding units such as a wire inert gas type torch. The torch body, generally indicated at 2, has an anterior portion 6 and a rear portion 8. The anterior part of the body 6 is held by the fingers of the welder. A head 10 is located at the forward end of the anterior portion. The head has an electrode 12 enclosed within a gas cup 14. In use the gas cup contains a protective flow of gas around the electrode and over the weld surface. The head would normally be cooled by a continuous internal flow of water. A drive wheel 18 is rotatably mounted on shaft 19 on the upper surface of the anterior portion of the torch body, immediately behind the head. Shaft 19 is anchored into anterior body portion 6. The drive wheel 18 may be a gear or pulley grooved for a belt. This is coupled to a similar wheel or gear 22 by an appropriate endless chain or belt 20. Gear 22 is mounted to shaft 23 of a potentiometer 24. The potentiometer 24 is connected by wiring, not shown, to the control circuitry outlined in FIG. 6.

Potentially, a finger operated rotary potentiometer at the location of drive wheel 18 might be used as a replacement for the linear potentiometer of U.S. Pat. No. 4,948,942 to overcome the problem of torch dipping during current adjustment. However, in order for the torch to be comfortable for the welder to hold, the torch body at this point may not be of sufficient diameter to accommodate anything except a very fragile, highly miniaturized potentiometer. Experience has shown the failure rate of the miniaturized devices used in a rough and tumble welding environment to be unacceptably high. The construction of the present invention overcomes this problem.

The rear portion 8 of the body is enlarged to accommodate a full sized rotary potentiometer. As was just noted, were the potentiometer placed at the location of drive wheel 18, only a highly miniaturized type would be usable. Otherwise, the body would have to be expanded so greatly as to make it uncomfortable to hold and control. These miniaturized potentiometers have a diameter of only about 10–15 mm. By moving the potentiometer to the location shown a larger and much more rugged unit may be employed. The diameter of the potentiometer used here could be in the 25–30 mm range without causing the welder any inconvenience of discomfort.

Completing the body of the unit is a supply line 30 which may include connections for cooling water, inert gas, control wiring, and an electrical circuit to the electrode.

In use, the welding current, voltage, or other operating parameter may be readily controlled by a fingertip against the drive wheel 18 or belt 20. Alternatively, wheels 18 and 22 and linkage 20 may be fully enclosed within the body and a simple upstanding knob, not shown, may be coupled to wheel 18 for current control.

Figure 4:
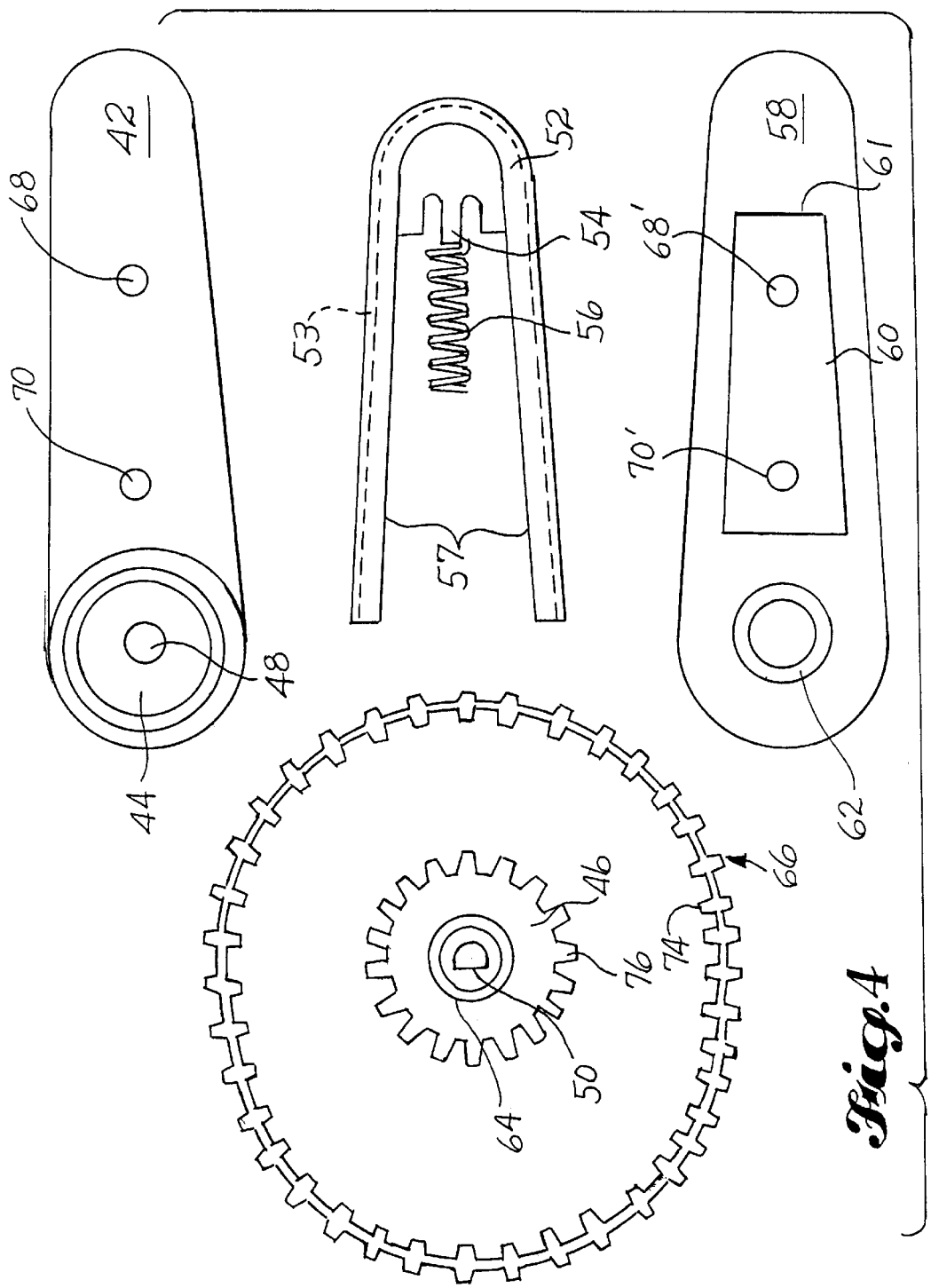
FIG. 4 is a disassembled view of an alternative control mechanism
Figure 5:
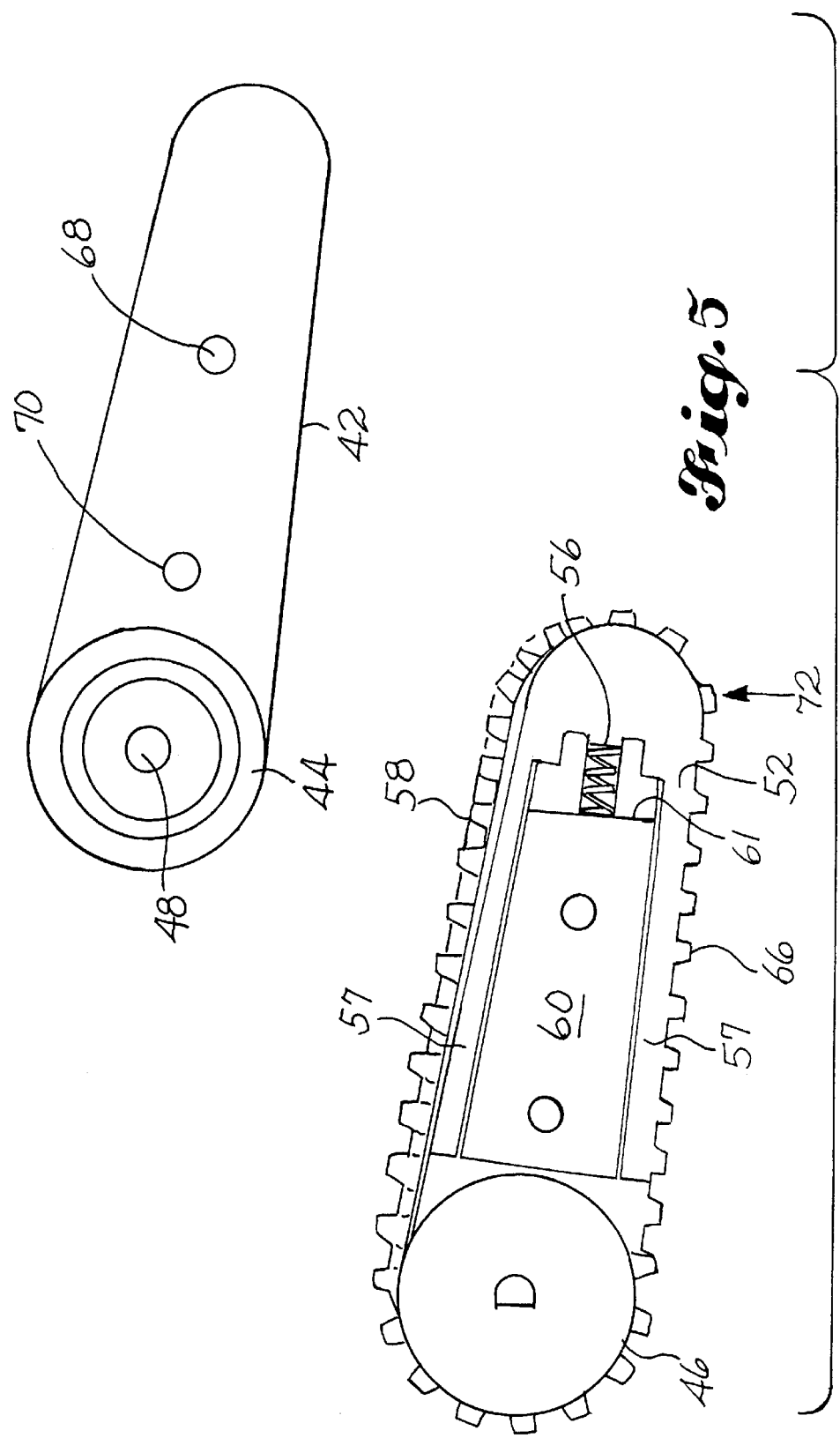
FIG. 5 is a partially assembled view of the alternative control mechanism

An alternative construction of the control mechanism which does not require the forward located drive wheel 18 is seen in FIGS. 4 and 5. A basal member 42, fitting next to the torch body, includes a cavity 44 to accommodate geared wheel 46. The shaft 23 of potentiometer 24 (FIG. 1) comes through opening 48 in the basal plate and is engaged in recess 50 of geared wheel 46. As seen in FIGS. 4 and 5, the underside of basal member 42 is located against the upper portion of the torch body. A forward oriented belt loop support 52 has arms 57 and a tang 54 to retain biasing spring 56. Support 52 is conveniently injection molded from a low friction plastic such as nylon or a fluorocarbon material. An upper piece of the assembly 58 has a raised boss 60 which may be centered, as seen in FIG. 4, or angled somewhat off-axis as in FIG. 5. When assembled, this raised boss is located between the arms 57 of belt loop support 52 to retain it in proper position. Spring 56 acts against the forward end 61 of boss 60 to bias belt loop support 52 forward. Upper assembly piece 58 also has a raised retainer ring 62 to enclose ring 64 on geared wheel 46 and assist in holding the wheel in position. Ring 64 acts as an axle to enable easy rotation of wheel 46. Spring 56 biases belt loop support 52 away from geared wheel 46 to retain the tightness of belt 66 when the unit is assembled.

FIG. 5 is shown partially assembled but upside down. Bolts passing through holes 68, 68',70, 70' hold the assembled control unit together and in place on the body of the torch. Boss 60 is shown angled off the center line so that the forward end of belt 66 is exposed at 72 for easy adjustment by the welder. In this particular construction belt 66 would be readily accessible to the index finger of a right handed welder at the operating position 72. This variation in position of boss 60 is not essential to the operation of the control.

While endless loop belt 66 is shown with molded in teeth 68 on both sides, this is not essential and other constructions are equally suitable. The inner teeth 74 of the belt engage corresponding teeth 76 of wheel 46. Channels 53 (FIG. 4) may be molded in the sides of belt loop support 52 keep belt 66 on track.

Figure 6:
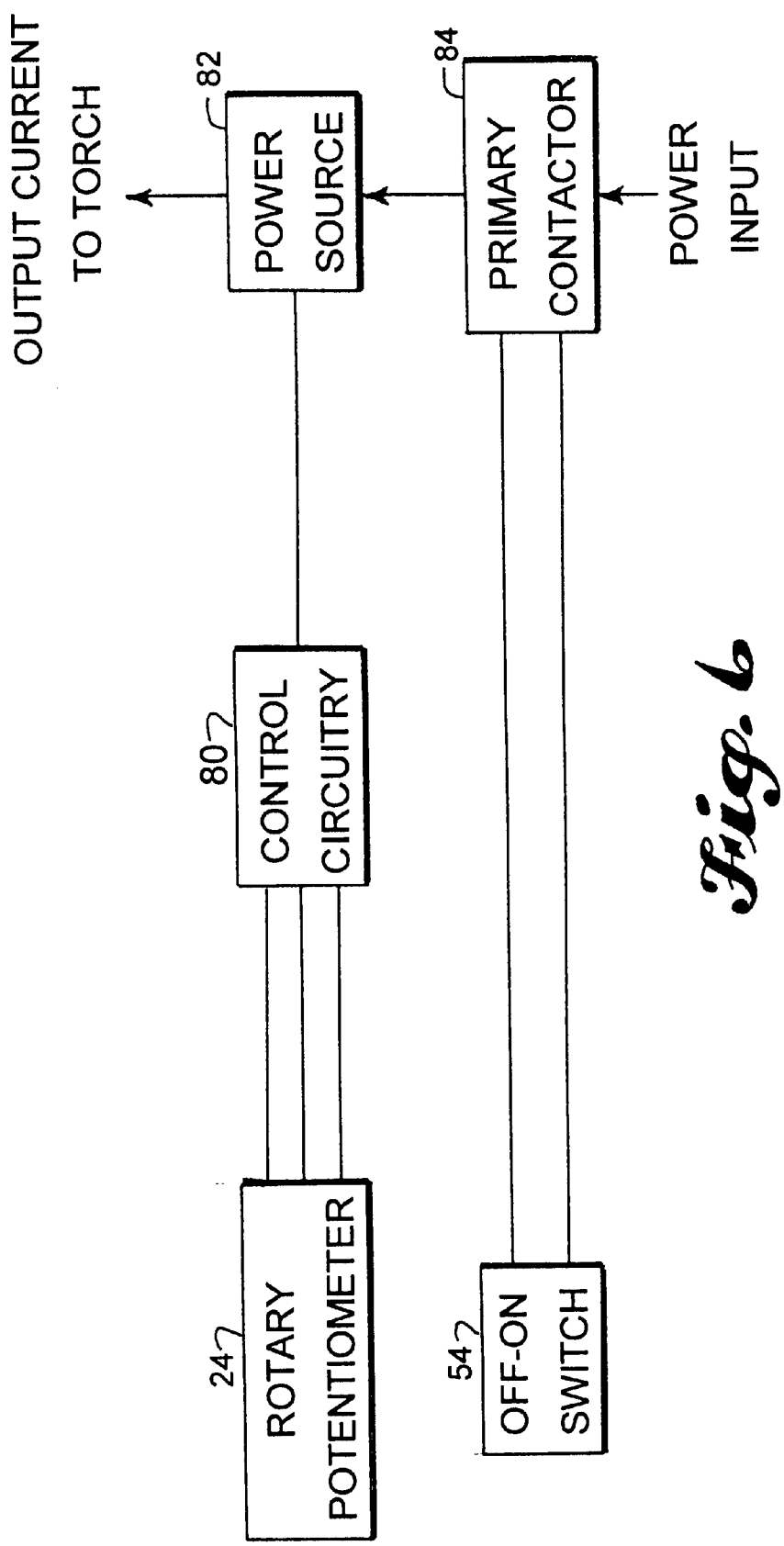
FIG. 6 is a block diagram outlining electrical circuitry.

As represented in FIG. 6, The rotary potentiometer 24 is located in a low voltage, low current circuit tied to control circuitry 80 which regulates the output of main power source 82. In similar fashion, the on/off switch 54, which may be axially coupled to potentiometer 24, is in a low voltage circuit which controls a primary or main contactor 84 on power source 82.

Figure 7:
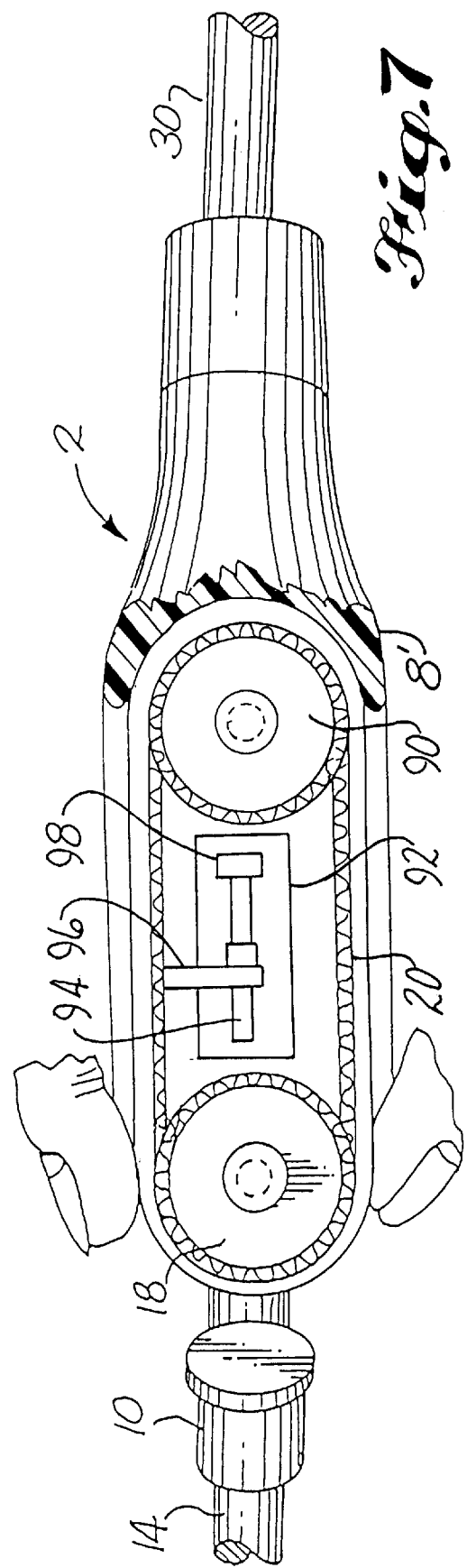
FIG. 7 shows an alternative construction of the torch using a linear potentiometer.

FIG. 7 shows an alternative construction using a linear potentiometer rather than the rotary potentiometer. This has a number of advantages since body 6 may be made slimmer and more space is provided within the body for routing gas and water lines. Referring back to FIG. 1, it will be noted that potentiometer 24 extends well into the posterior portion 8 of the body. This requires the incoming gas and water lines, not shown, to be tightly bent so as to closely conform to the lower surface of the body cavity, under the potentiometer. Using a linear potentiometer these lines can pass essentially straight through the body to the head portion, thus considerably simplifying manufacture. Returning again to FIG. 7, the drive wheel 22 of rotary potentiometer 24 is replaced with an idler wheel 90. Linear potentiometer 92 is located in the space between forward drive wheel 18 and idler wheel 90. This has a resistance strip 94 and a sliding contactor 96 that is linked to belt 20. An on-off switch 98 operable by the contactor may optionally be located at one end of the resistance strip. To simplify representation, control wiring from the potentiometer and switch is not shown. It will be seen that the rear body portion 8' may be considerably slimmer than its counterpart 8 as seen in the earlier figures.

It will be evident to those skilled in the art that many changes could be made in the mechanism described without departing from the spirit of the present invention. With the full understanding that such changes in construction and operation might be made, the invention should be considered limited only as it is defined in the appended claims.

What is claimed is:

1. A welding torch which comprises:

an axially elongated body, sized to be comfortably held in a welder's hand, the body having anterior and rear portions;

a head attached to the anterior portion of the body, the head configured to contain a welding electrode and means to shield the electrode and any adjacent weld area with a blanketing gas;

a control means located on the anterior portion of the body posterior to the head, the control being positioned so as to be operable by the thumb or index finger of a welder when the torch is in use;

a linear-type potentiometer contained within the rear portion of the body; and a closed loop belt linking the control means with the potentiometer so that the potentiometer is responsive to control means adjustments made by the welder.

2. The welding torch of claim 1 which additionally contains an on-off switch linked to the potentiometer.

3. The welding torch of claim 1 in which the control means and linking mechanism are enclosed within the body of the torch.

4. The welding torch of claim 1 in which the control means comprises a closed loop belt looped around spaced apart idler wheels.

5. The welding torch of claim 1 in which the control means comprises a closed loop belt looped around an idler wheel and a low friction surface.

* * * * *